No. 886,179. PATENTED APR. 28, 1908.
D. R. BRAGUNIER & A. B. THOMPSON.
AUTOMATIC ELECTRIC COTTON CHOPPER.
APPLICATION FILED MAY 14, 1907.
2 SHEETS—SHEET 1.
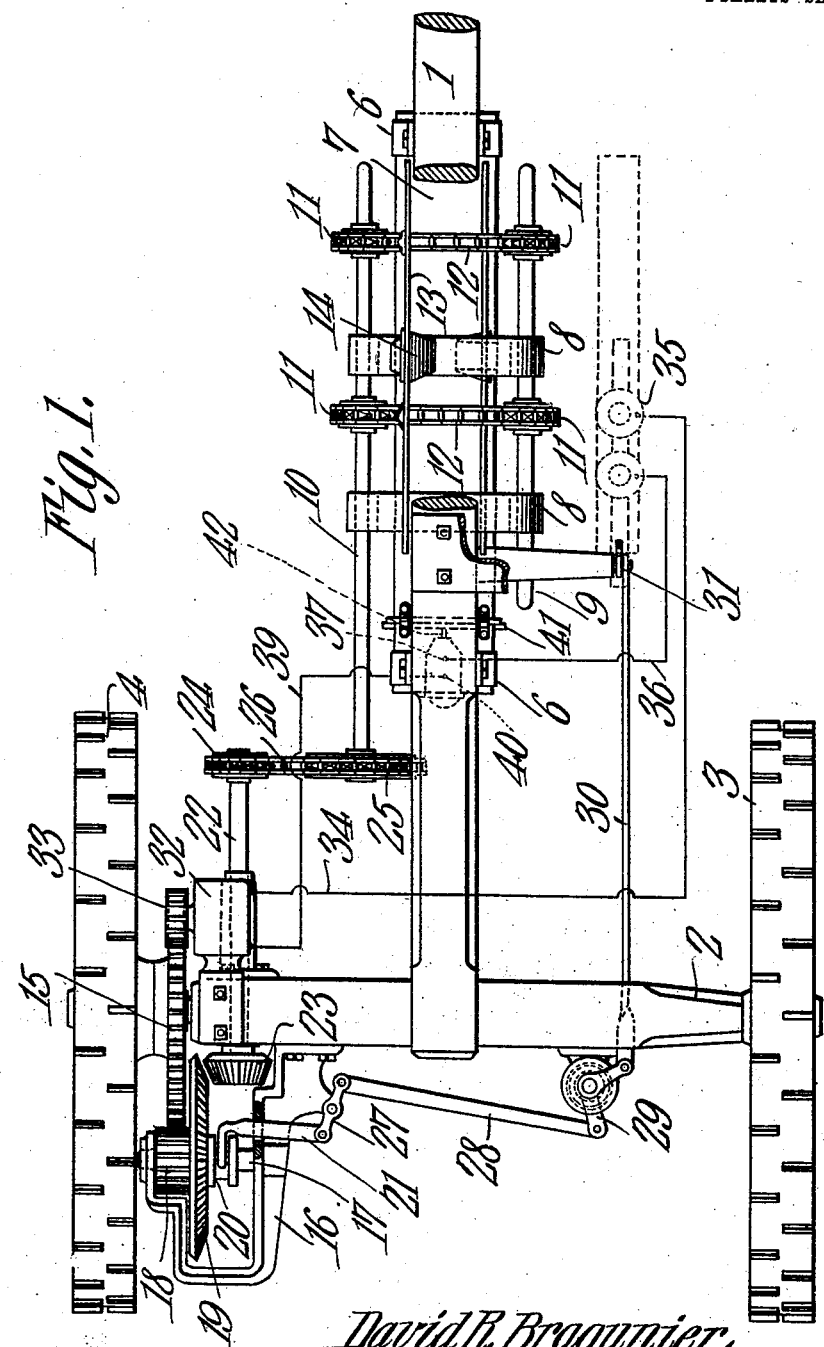
WITNESSES:
David R. Bragunier,
Alford B. Thompson, INVENTORS
By C. A. Snow & Co.
ATTORNEYS

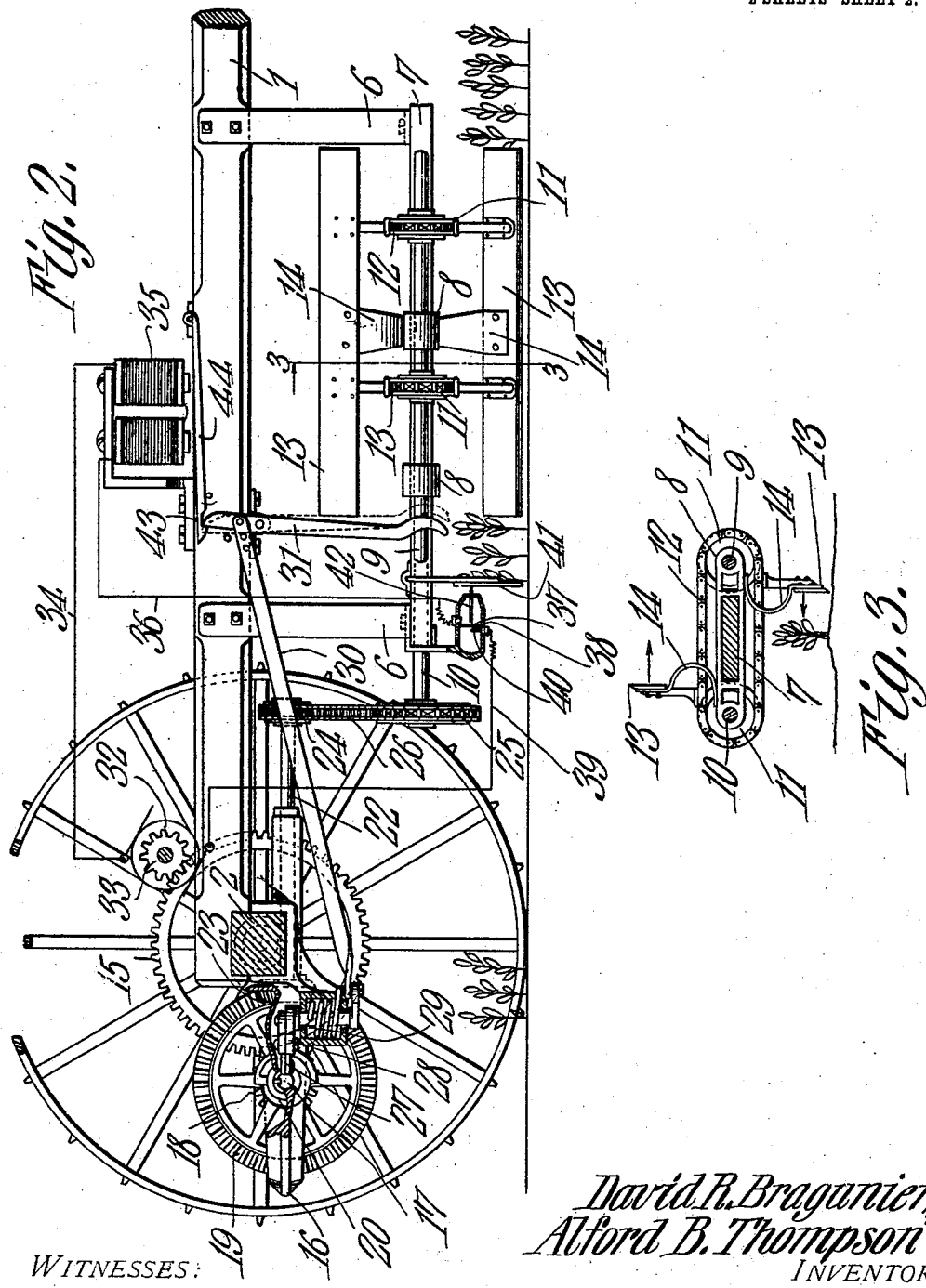

UNITED STATES PATENT OFFICE.

DAVID RALPH BRAGUNIER AND ALFORD B. THOMPSON, OF COLUMBIA, ALABAMA.

AUTOMATIC ELECTRIC COTTON-CHOPPER.

No. 886,179.          Specification of Letters Patent.          Patented April 28, 1908.

Application filed May 14, 1907. Serial No. 373,549.

*To all whom it may concern:*

Be it known that we, DAVID RALPH BRAGUNIER and ALFORD B. THOMPSON, citizens of the United States, residing at Columbia, in the county of Houston and State of Alabama, have invented a new and useful Automatic Electric Cotton-Chopper, of which the following is a specification.

This invention has relation to automatic electric cotton choppers and it consists in the novel construction and arrangement of its parts as hereinafter shown and described.

The object of the invention is to provide a cotton chopper of the character indicated which consists of a series of blades adapted to move orbitally across the row of plants in order to remove the superfluous growth. The blades are actuated at intervals through mechanism operatively connected with a traction wheel which forms one of the supports of the implement.

The implement is provided with an electric generator which is operated by the said traction wheel and the terminals of which are electrically connected with a circuit closer. A pendent trip is provided for operating the circuit closer when the said trip comes in contact with plants left standing in the row. Electro-magnets are connected in the circuit and operate a relay in the form of a catch. Said relay is in the path of one end of a lever which is connected with a spring actuated clutch mechanism for transmitting movement at intervals from the traction wheel to the mechanism for actuating the blades. Said relay is adapted to retain the adjacent end of the lever against the tension of the spring of the clutch mechanism and when the circuit is closed by the aforesaid trip coming in contact with the plants and the magnets are energized the catch end of the relay is moved out of the path of the lever and the same is permitted to swing under the tension of the aforesaid spring and the opposite end of the lever is carried into the path of the chopping blade and remains in such position until engaged by the approaching chopping blade when it is moved back against the tension of the clutch spring into its normal position and in the meantime another blade has traversed the row of plants and cut out a section of the same.

In the accompanying drawing:—Figure 1 is a top plan view of the implement. Fig. 2 is a side elevation of the same, and Fig. 3 is a transverse sectional view of the blades supporting platform and attached parts.

The chopper consists of the tongue 1 the rear end of which is supported upon the axle 2. The said axle is supported by a ground wheel 3 and a traction wheel 4. The brackets 6 depend from the tongue 1 and are connected together by the platform 7. The bearings 8 are mounted upon the platform 7 and extend laterally beyond the edges of the same. The shafts 9 and 10 are journaled in the opposite ends of the bearings 8 and are located along opposite edges of the platform 7. The sprocket wheels 11 are mounted upon the shafts 9 and 10 and the sprocket chains 12 pass around the sprocket wheels upon the opposite shafts. The hoe blades 13 are located at intervals upon the sprocket chains 12 and are provided with the lugs 14 which move along one of the bearings 8 and maintain the said blade at proper distances from the platform 7 when under stress. The gear wheel 15 is fixed to the hub of the traction wheel 4. The bracket 16 is attached to the axle 2 and the stub shaft 17 is carried by said bracket. The gear wheel 18 is journaled upon the shaft 17 and meshes with the gear wheel 15. The gear wheel 18 is attached to the side of the beveled gear wheel 19 which is provided at one side with a collar 20 which is engaged by a link 21. A shaft 22 is journaled for rotation and extends parallel with the tongue 1. Said shaft 22 is provided at its rear end with a beveled gear wheel 23 which is adapted to be engaged and disengaged by the beveled gear wheel 19. The beveled gear wheel 19 and the gear 18 are adapted to move laterally and form a clutch mechanism and are actuated by rods and a lever as will be hereinafter explained. The forward end of the shaft 22 is provided with a sprocket wheel 24. The rear end of the shaft 10 is provided with a sprocket wheel 25. The sprocket chain 26 passes around the sprocket wheels 24 and 25. One end of the link 21 is connected with a lever 27 and the opposite end of the said lever is connected with the rod 28. The rod 28 extends parallel with the axle 2 and is connected with a spring actuated rocker 29. The tension of the spring of said rocker is such as to have a tendency to hold the clutch, above referred to, in gear with the gear wheel 15 and the beveled pinion 23. The rod 30 connects the rocker 29 with the lever 31 which is fulcrumed upon the tongue 1. When the clutch mechanism is in gear with the gear wheel, as above stated, the lower end of the lever 31 extends into the path of the hoe blades 13. The generator 32 is also mounted upon the axle 2 and the shaft of its armature is provided with the gear wheel 33 which meshes with the gear wheel 13. The wire 34 connects one of the poles of the generator with the electro-magnets 35 and the wire 36 connects the said electro-magnets with a terminal 37 which is located in the casing 38. The wire 39 connects the other pole of the generator 32 with the terminal 40 also located in the casing 38. The said terminals 37 and 40 are normally spaced apart but the terminal 40 may be moved into contact with the terminal 37, thus, forming a circuit closer. The trip 41 hangs pendent from the platform 7 and is provided with a rod 42 which enters the casing 38 and attaches with the terminal 40.

From the foregoing description it is obvious that as the implement is drawn along the ground the rotation of the traction wheel 4 through the gear wheels 15 and 33 operate the generator 32 and energize the same. In the mean time, the lower end of the lever 31 has been engaged by one of the blades 13 and the upper end of the said lever has been moved under the catch end 43 of the relay 44. Said relay is located under the electro-magnets 35 and the catch end 43 thereof holds the lever 31 against the tension of the spring of the rocker 21 and consequently, the clutch is out of gear with the traction wheel 4 and the shaft 22. During the contact of one of the blades 13 with the lever 31, as above described, the other blade 13 has traversed the row of plants and removed a section therefrom. The implement now passes along the space from which the plants have been removed and when the trip 41 comes in contact with the plants left standing at the end of the space the plants brush the trip back which carries with it the rod 41 and the terminal 40. When the terminal 40 comes in contact with the terminal 37 an electric circuit is completed from the generator 32 along wire 34, electro-magnets 35, wire 36, terminals 37 and 40, and wire 39, back to the generator. Thus the magnets 35 are energized and the magnetism acting upon the relay 44 attracts the same and lifts the catch end 43 thereof out of the path of the upper end of the lever 31. Thus, the tension of the spring of the rocker 29 may come into play and operate the clutch mechanism so that the means for actuating the blades 13 is thrown in gear with the traction wheel and the blades are moved as above described and a succeeding section is cut out of the row of plants with several plants left standing at the interval occurring between the previously mentioned and succeeding sections removed by the blade. The operation above described is repeated throughout the length of the row.

Having described the invention what we claim as new and desire to secure by Letters-Patent is:—

1. A chopper comprising a chopping blade, means for actuating the same, an electric generator mounted upon the chopper, a circuit closer operatively connected with the terminals thereof, an electro-magnetic catch mechanism connected with the electric circuit, and a spring actuated lever for engaging the catch mechanism and the blade.

2. A chopper comprising a movable blade, means for disconnecting the blade from its actuating means and an electrically operated catch mechanism for retaining the first said means.

3. A chopper comprising a movable blade, movable means for disconnecting the blade from its actuating means which extends at intervals into the path of the blade, and an electrically operated catch mechanism for retaining the first said means out of the path of the blade.

4. A chopper comprising a movable blade, movable means for disconnecting the blade from its actuating means which extends at intervals into the path of the blade, an electrically operated catch mechanism for retaining the first said means out of the path of the blade, and a trip operated circuit closing means electrically connected with the catch mechanism.

5. A chopper comprising a movable blade, movable means for disconnecting the blade from its actuating means which extends at intervals into the path of the blade, a spring for holding said means in the path of the blade, an electrically operated catch mechanism for retaining the first said means out of the path of the blade, and a trip operated circuit closing means electrically connected with the catch mechanism.

6. A chopper comprising an orbitally movable blade, means for actuating the same, means for interrupting the action of the actuating means and electrically operated means for controlling the interrupting means.

7. A chopper comprising orbitally movable blades, chains carrying the same, and means for actuating the chains at intervals.

8. A chopper comprising orbitally movable blades, chains carrying the same, means for actuating the chains, means for interrupting the action of the actuating means, and electrically operated means for controlling the interrupting means.

9. A chopper comprising orbitally movable blades, means for actuating the same, means for interrupting the action of the actuating means, an electrically operated means for controlling the interrupting means, and a trip actuated circuit closer electrically connected with the last said means.

10. A cotton chopper having a chopping blade and means for actuating the blade adapted to be operated by contact with a standing plant.

11. A cotton chopper having a chopping blade, and means including an electric circuit for actuating the blade adapted to be operated by contact with a standing plant.

In testimony that we claim the foregoing as our own, we have hereto affixed our signatures in the presence of two witnesses.

DAVID RALPH BRAGUNIER.
ALFORD B. THOMPSON.

Witnesses:
BRITT HOLLAND,
FRANK F. KOERBER.